United States Patent
Arreola (10) Patent No.: US 12,207,757 B2
(45) Date of Patent: Jan. 28, 2025

(54) MACHINE FOR PREPARING HOT BEVERAGES

(71) Applicant: Fabian Sanchez Arreola, Tijuana (MX)

(72) Inventor: Fabian Sanchez Arreola, Tijuana (MX)

( * ) Notice: Subject to any disclaimer, the term of this patent is extended or adjusted under 35 U.S.C. 154(b) by 923 days.

(21) Appl. No.: 15/733,677

(22) PCT Filed: Mar. 28, 2018

(86) PCT No.: PCT/MX2018/000033
§ 371 (c)(1),
(2) Date: Sep. 28, 2020

(87) PCT Pub. No.: WO2019/190300
PCT Pub. Date: Oct. 3, 2019

(65) Prior Publication Data
US 2021/0015296 A1    Jan. 21, 2021

(51) Int. Cl.
*A47J 31/52*    (2006.01)
*A47J 31/46*    (2006.01)
*A47J 31/54*    (2006.01)

(52) U.S. Cl.
CPC ......... *A47J 31/5255* (2018.08); *A47J 31/461* (2018.08); *A47J 31/468* (2018.08); *A47J 31/54* (2013.01)

(58) Field of Classification Search
CPC .... A47J 31/5255; A47J 31/461; A47J 31/468; A47J 31/54; A47J 31/5251; A47J 31/5253; A47J 31/469; A47J 31/4403
See application file for complete search history.

(56) References Cited

U.S. PATENT DOCUMENTS

2015/0201796 A1* 7/2015 Kuempel ................ A47J 31/52
99/283
2018/0357597 A1* 12/2018 Magatti ............... A47J 31/3623

FOREIGN PATENT DOCUMENTS

| ES | 2247289 T | 3/2006 | |
|---|---|---|---|
| WO | WO-2012151629 A1 * | 11/2012 | ............ A47G 19/14 |
| WO | 2016/186404 | 11/2016 | |
| WO | 2017/089337 | 6/2017 | |

* cited by examiner

*Primary Examiner* — Brian W Jennison
(74) *Attorney, Agent, or Firm* — Bauer and Joseph (57) ABSTRACT

Machine to prepare hot beverages that uses means of heating a secondary liquid, which transfers temperature to the primary liquid that is used to prepare the hot drink. The machine is fully operated through software that allows the pressure and temperature parameters of each drink prepared in the machine to be saved and accurately reproduced.

12 Claims, 10 Drawing Sheets

MACHINE FOR PREPARING HOT BEVERAGES

The present invention relates to a machine for the preparation of beverages, especially those designed for the preparation of espresso coffee.

BACKGROUND OF THE INVENTION

Since the discovery of coffee as a drink, man has developed various preparation techniques, based mainly on ways of infusing roasted and ground beans.

With industrial development, the invention of the espresso coffee machine arises, which to date can be considered the one with the greatest specialization in terms of technology and preparation procedures.

Espresso machines basically work by passing hot water or steam under pressure through a filter of ground coffee. From this operation, the technology used in these machines consists of obtaining said hot water or and/or steam from a tank or boiler, the main component of the machine to produce said hot water or steam.

Among the technologies to conduct pressurized water or steam through the ground coffee filter (espresso extraction), there are the first machines invented, which released steam through different conduits according to the type of coffee to be prepared, manual piston and spring machines, and electric pump machines.

By the type of boiler, the ones with a single boiler, a single dual-use boiler, a single boiler with heat exchanger and a double boiler are currently known.

Regarding the degree of automation, there are semi-automatic machines whose operation mainly comprises a pump and a combination of valves, and automatic machines, which have devices to control the volume of liquid that is sent to the filter of ground coffee.

One of the main problems that espresso machines present is the gradual deterioration of the quality of the coffee that is prepared from said machines, due to the accumulation of scale in the boiler, in the valves and in the hot water or steam pipes. Water. This problem is regularly corrected by performing a deep cleaning of the machine, which implies disassembling it and immersing the components in cleaning liquids or descaling of scale, to later rub with abrasive fiber until removing any trace of dirt caused by the accumulation and deposit of salts present in water. This is a laborious process that means suspending use of the machine for a considerable number of hours.

There are some technologies that have tried to solve the scale build-up problem through systems that include a "self-cleaning" process, as described in the following patent document:

"WO2017067854A1".—PCT patent application of Italian origin (La Marzocco, S. R. L.), published in 2017, which calls for the invention of an espresso machine with a system for cleaning the coffee dispensing system and the discharge system. The main novelty aspect is based on the configuration of the machine to operate in the modes: serve coffee, discharge the water from the system and clean the circuit. The cleaning system focuses especially on the sieve (screen) located before the filter holder, noting that the machine can be electronically automated to activate the cleaning mode after each preparation or a certain number of preparations. They claim that this system allows the machine to require cleaning maintenance every time a conventional machine requires 9 maintenance (disassembled).

An efficient solution to avoid the accumulation of scale is to eliminate the traditional boiler of the espresso machine, which means that the water is not stored and heated in the tank of the traditional boiler, having to heat the water as it flows towards the dispenser that passes it through the ground coffee filter. However, given the need to maintain controlled temperature and pressure to obtain a good espresso, this system had not been successfully developed until before our invention.

DESCRIPTION OF THE INVENTION

Figure 1:
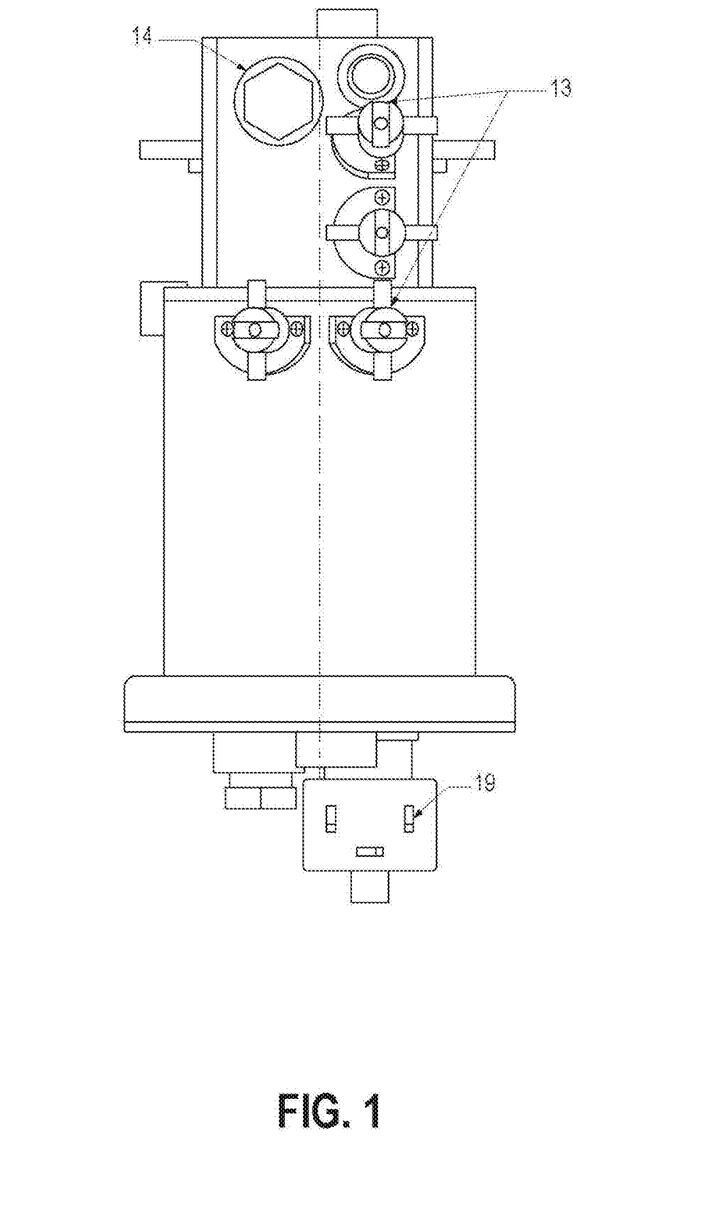
FIG. 1. It is a side view of the main body of the machine showing its internal components, among which can be seen: thermistors (13), electric resistances (14), the coil (17) in the body of the boiler, the coil (18) in the machine head, the extraction duct (21) and the three-way solenoid valve (16).
Figure 2:
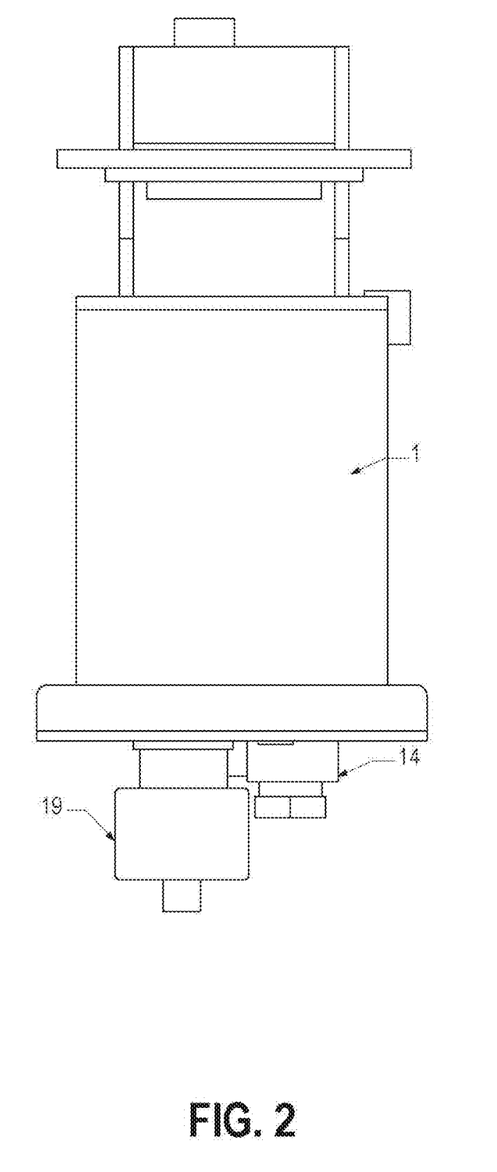
FIG. 2. Shows a rear view of the main body of the machine, where one of the electrical resistances (14), several of the thermistors (13) and the three-way solenoid valve (16) can be seen.
Figure 3:
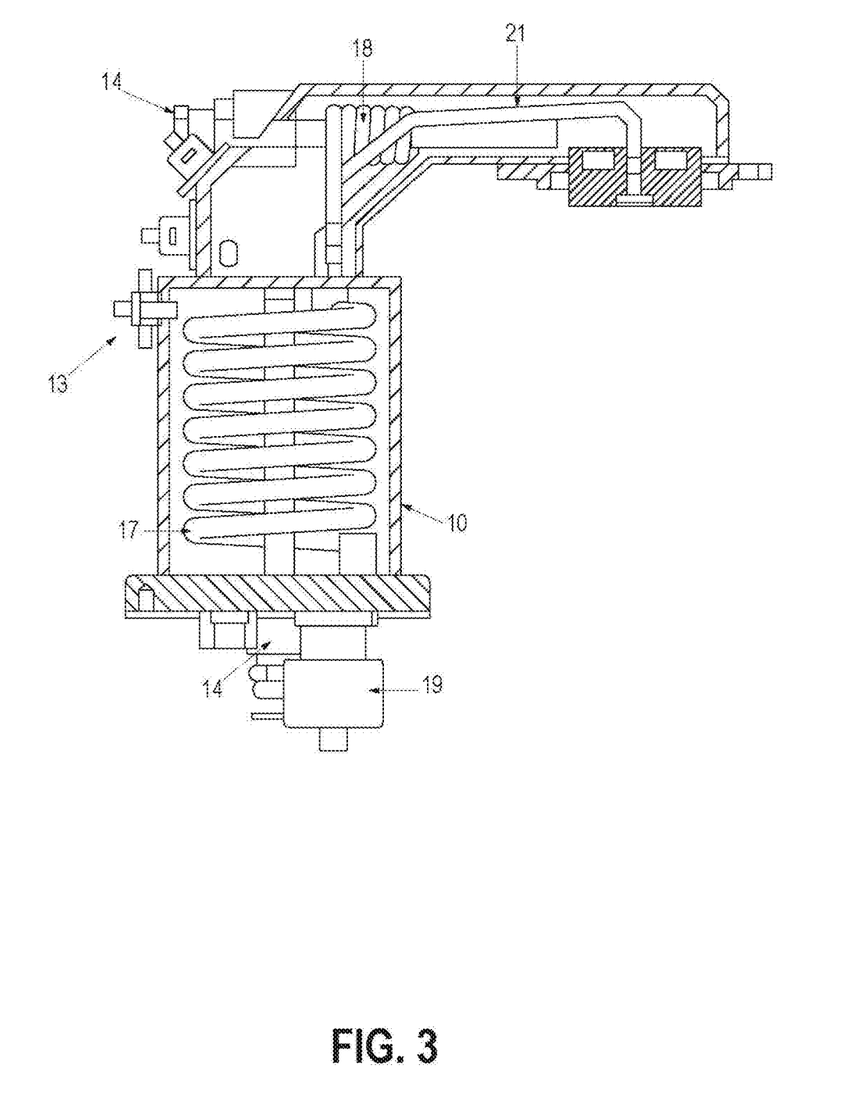
FIG. 3. It shows a front view of the main body of the machine, where the boiler body (1) and the three-way solenoid valve (16) are indicated.
Figure 4:
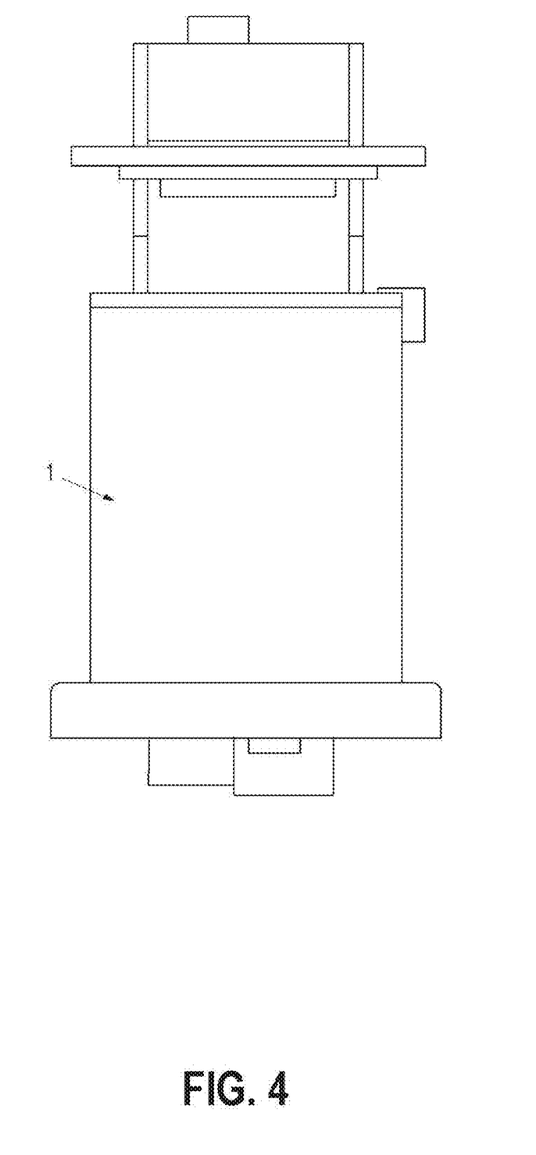
FIG. 4. It shows a side view of the main body of the machine, where you can see several thermistors (13), the extraction duct (21), one of the electrical resistances (14), the coil (18) in the extraction head and the location secondary liquid fill coupling (11).
Figure 5:
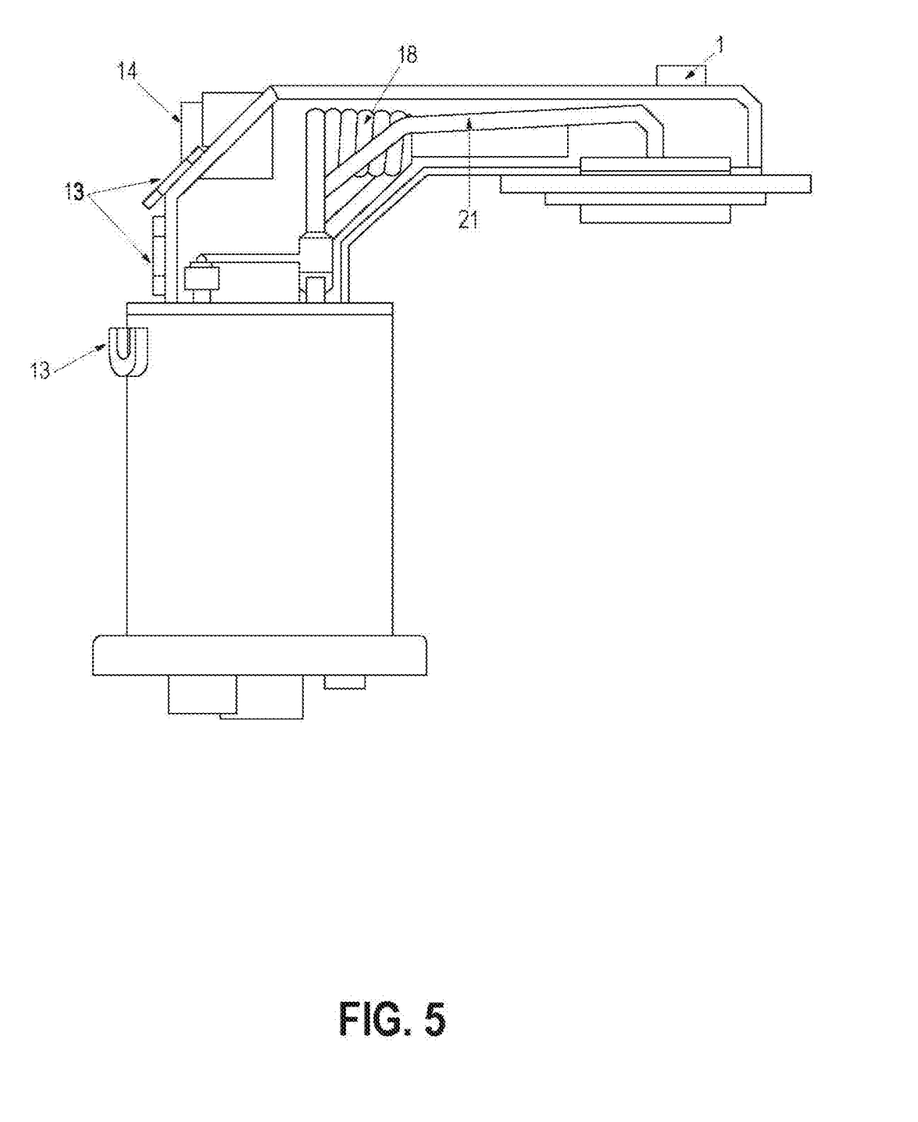
FIG. 5. It shows a side section of the machine where you can see the pair of conduits (2) in the center of the helical that makes up the coil (17), housing one of the electrical resistances (14), one of the thermistors (13) and the coil (18) in the head of the machine.
Figure 6:
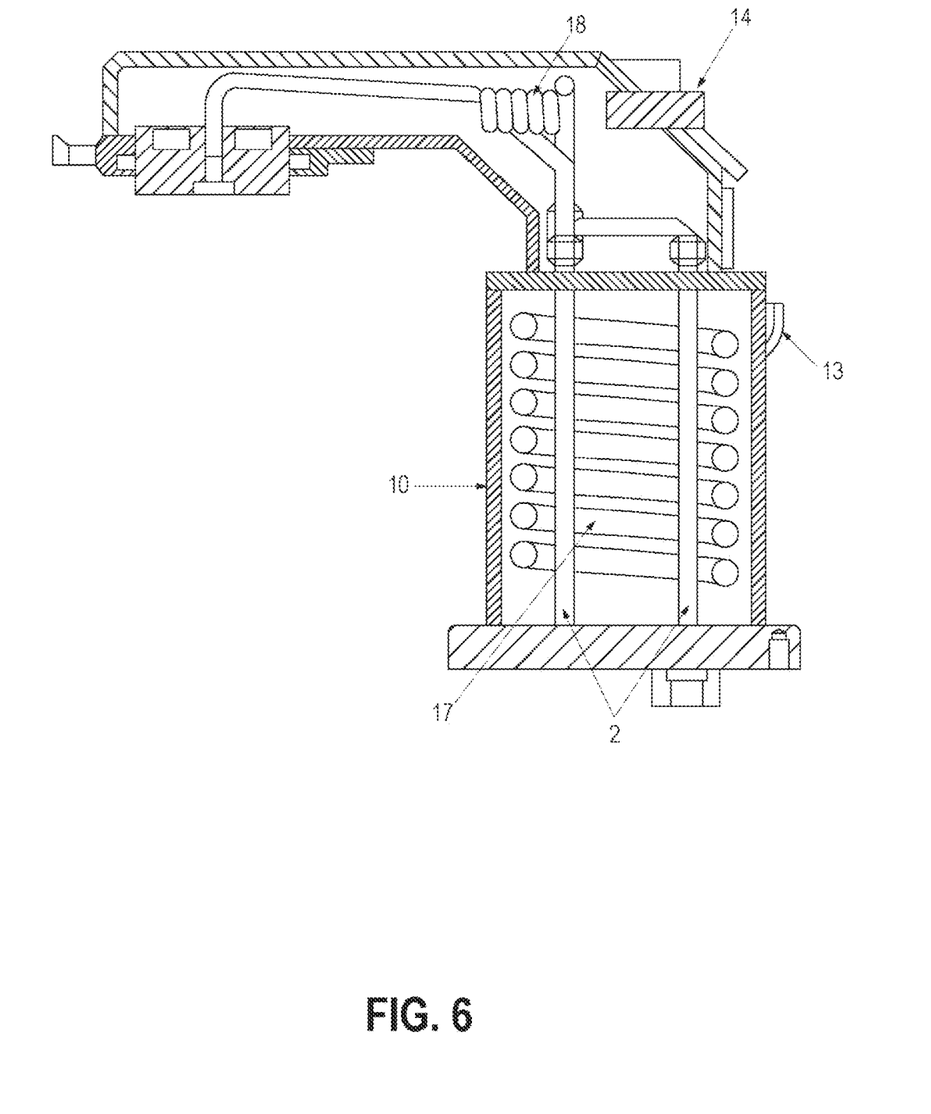
FIG. 6. It shows a top view of the main body of the machine where the location of several thermistors (13), one of the electrical resistances (14) and the secondary liquid filling couplings (11) can be seen.
Figure 7:
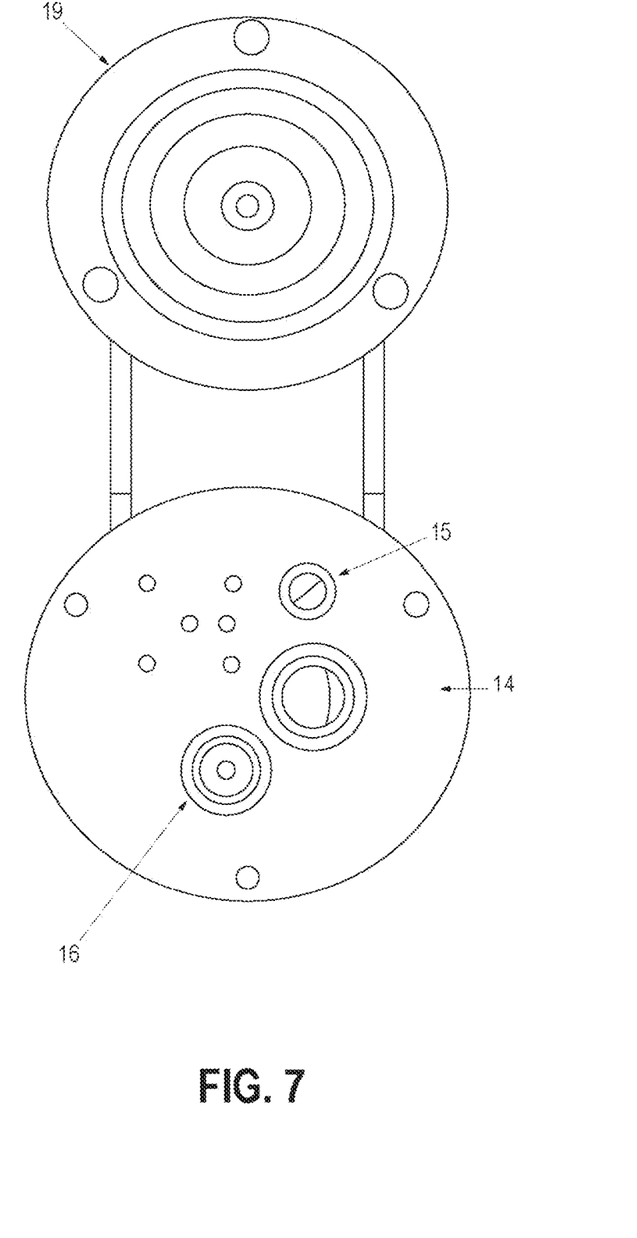
FIG. 7. It shows a bottom view of the main body of the machine where the location of one of the surface mounting bolts (5), one of the safety couplings (6), of the valve mounting plate (7), of one of the resistors (14), of the primary liquid inlet coupling (15), of the three-way solenoid valve (16) and of the grooved ring (19).
Figure 8:
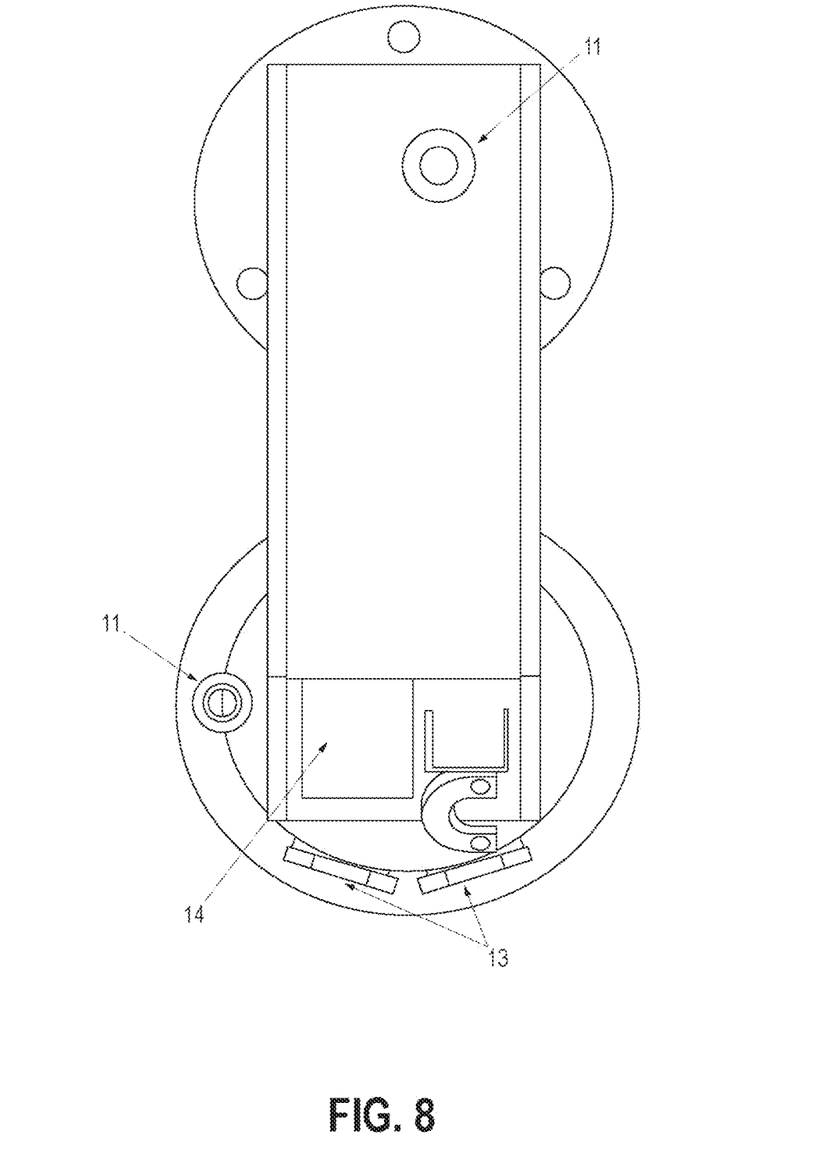
FIG. 8 shows a top view of the main body of the machine.
Figure 9:
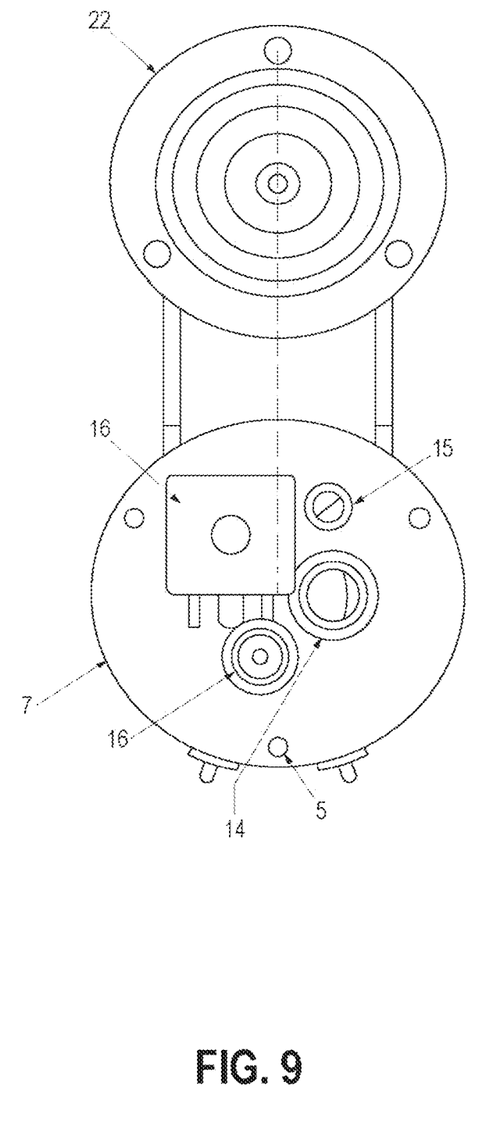
FIG. 9 shows a bottom view of another embodiment of the main body of the machine.
Figure 10:
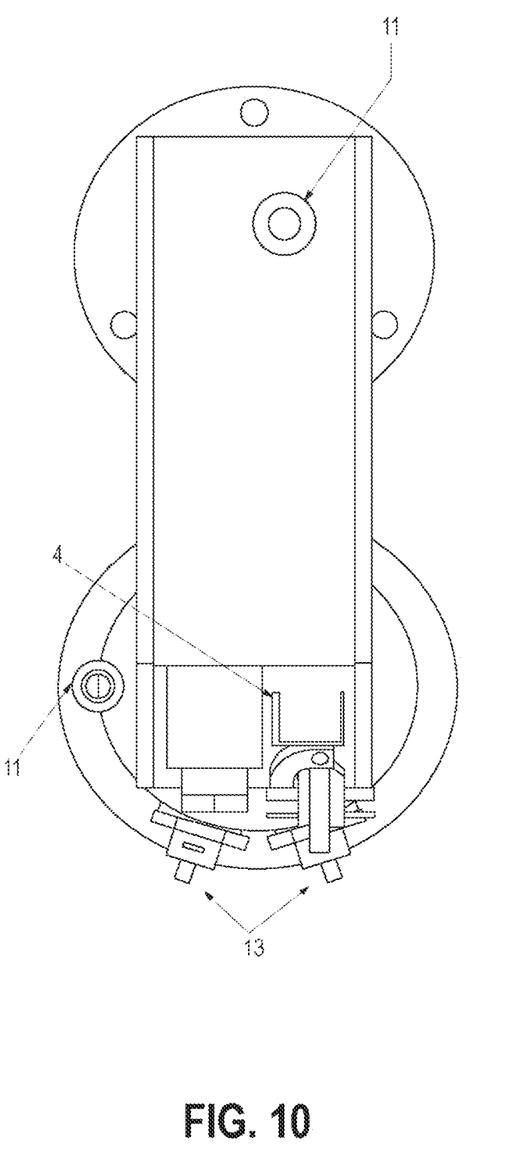
FIG. 10 shows a top view of another embodiment of the main body of the machine.

It is a machine for preparing espresso coffee that comprises a boiler, preferably made of food grade stainless steel, which houses a pair of water pipes (2) that integrate heating elements controlled by RTD probes and flow meters or flow meters to control the volume of liquid in relation to the required temperature in the pair of water pipes (2).

The machine also includes a metal coil (18) located prior to the point of extraction of the coffee infusion which allows obtaining gain from the heat generated in the pair of ducts (2) and transferring it to the extraction duct (21), to carry the primary liquid at the temperature established as a parameter for the extraction of each "shot" of espresso, without mixing with the water contained in the pair of pipes (2), which we will call from here on "secondary liquid", to differentiate it from water used for extraction (primary liquid).

In its integral composition, the machine comprises a boiler (1); at least one pair of filling valves of the boiler (11); at least one filling valve for the primary liquid conduits (15); at least one pair of solenoid valves to control the flow and flow of the water that is conducted through a coil (17) made of food grade stainless steel, housed inside the boiler (1); at least one pair of electric resistors (14) housed one in the upper part and the other in the lower part of the main body of the machine, at least four safety mechanisms (6) of the liquid temperature, consisting of current switches; at least one pair of heat exchangers to raise the temperature of the primary liquid; At least one pair of temperature transmitting RTD probes; a grooved stainless steel ring and hermetic gasket (19), integrated into the base of the boiler (1); a hydraulic pump with variable speed and pressure; at least one three-way solenoid valve (16), located at the base of the boiler (1); digital pressure readers; at least one pair of current transformers; a printed circuit board to control, by means of software, analog and digital outputs and wireless data connections such as wi-fi and bluetooth; at least one speed variator of the pump; a potentiometer; at least one touch screen; a plurality of electronic buttons; a plurality of solid state relays; a main on/off switch; a support structure, preferably made of light metallic material, which fulfills the function of housing all the internal components of the machine; an outer casing (10) that can be made of plastic materials, metal, carbon fiber, fiberglass, wood or a combination of these, which covers all the internal components of the machine, including the metal support structure.

The operation of the espresso machine is assisted by a computer program which completely automates its operation. Said computer program controls each pressure and temperature parameter of the machine by sending and receiving signals from the temperature sensors, pressure meters, flow meters, pump, valves and RTD probes, recording the parameters of each extraction to reproduce them. indefinitely from a data memory included in the hardware where the computer program runs, the main component of said hardware being a printed circuit board that has analog outputs, digital outputs and wireless data connection devices.

The operation of the espresso machine object of the present invention has as a first step the turning on of the machine and introducing, through the touch screen, the desired temperature and pressure parameters for the extraction of a "shot" of coffee, immediately The option to "start extraction" is selected, triggering signals to the heating resistors (14) and to the pump to start raising the temperature of the secondary liquid in the boiler (1) and raising the pressure of the primary liquid. As soon as the temperature signals sent by the RTD probes and by the pressure transmitter connected to the analog-digital converter, indicate that both the temperature and the pressure of the primary liquid have reached the established parameters, the computer program automatically sends a signal to the solenoid valve (16) to release the required amount of water for an extraction. In the internal operation of the machine, the primary liquid raises its temperature as it circulates through the first coil (17), located inside the boiler (1), where said first coil (17) is kept in a medium saturated by the secondary liquid, said secondary liquid being able to be distilled water or another non-toxic liquid, whose thermal qualities and coefficient of expansion make it an efficient medium for a first transfer of heat to the primary liquid. When the computer program that controls the machine sends the signal to the solenoid valve (19) to release the flow of the primary liquid towards the extraction head (21), the heating resistance (14) located prior to the extraction duct (21) and surrounded by the second coil (18), raising its temperature, where the primary liquid that flows through said extraction conduit section (21) has a sufficient temperature gain so that when said primary liquid passes through the extraction tablet It is precisely at the temperature initially established as a parameter for said extraction. At the same time, the speed variator of the pump maintains the operation of the pump in a range such that the pressure of the primary liquid when exiting the extraction conduit (21) is precisely the one initially established as the pressure parameter for said extraction.

What is claimed:

1. A machine for preparing hot beverages comprising:
   a body having an upper part, a middle part, and lower part with a boiler mounted within the middle part;
   the body middle part having a boiler mounted therein with the boiler having a pair of water pipes, a coil for heating the pair of water pipes, and a base with a grooved ring integrated therein, a hermetic gasket integrated therein, and at least one pair of solenoid valves to control the flow of liquid through the coil;
   the body upper part having a primary liquid conduit for receiving liquid therein in fluid communication with the pair of water pipes with the primary liquid conduit having at least one pair of filling valves positioned therein;
   a hydraulic pump for pumping liquid through the body with a variator for providing the hydraulic pump to pump the liquid at variable speeds and pressures;
   at least one pair of electric resistors with one of the pair of electrical resistors being mounted within the upper part of the body and the other one of the pair of electrical resistors being mounted within the lower part of body;
   at least one pair of current transformers coupled to the at least one pair of electrical resistors;
   a plurality of four current switches mounted within the body;
   at least one pair of heat exchangers mounted within the middle part of the body to raise the temperature of liquid within the boiler;
   at least one resistance temperature detector probe for measuring the temperature of liquid within the body;
   at least one digital pressure reader for measuring the pressure of the liquid within the body;
   at least one pair of flow meters for controlling the volume of liquid in relation to the required temperature within the pair of water pipes; and
   a printed circuit board with a wireless data connector for connecting to a network;
   wherein the printed circuit board is coupled to the boiler, the hydraulic pump, the plurality of current switches, and the at least one pair of flow meters;
   wherein the printed circuit board receives input from the at least one resistance temperature detector probe and the at least one digital pressure reader; and
   wherein the printed circuit board sends output to the boiler in response to input from the at least one resistance temperature detector probe and the at least one digital pressure reader.

2. The machine of claim 1, wherein the plurality of current switches includes at least four current switches.

3. The machine of claim 1, wherein at least one pair of solenoid valves is a three-way solenoid valve.

4. The machine of claim 1, wherein the grooved ring is a stainless steel grooved ring.

5. The machine of claim 1, wherein the wireless data connector communicates with the network using at least one of a wifi connection and a Bluetooth connection.

6. The machine of claim 1, further comprising:
a support structure having the printed circuit board, a potentiometer, at least one touch screen, a plurality of electronic buttons, a plurality of solid state relays, and a main on/off switch mounted therein.

7. The machine of claim 6, wherein the support structure is made from metal.

8. The machine of claim 1, wherein the middle part includes a casing for covering the boiler.

9. The machine of claim 1, wherein the pair of water pipes and the coil are positioned within the boiler.

10. The machine of claim 9, wherein the coil is configured in a helix and the pair of water pipes are arranges in the center of the helix.

11. The machine of claim 9, wherein at least one resistance temperature detector probe obtains temperature measurements of the liquid within the pair of water pipes and communicates the temperature measurements to the printed circuit board, so that the printed circuit board can adjust the temperature of the liquid within the pair of water pipes.

12. The machine of claim 1, further comprising:
saturation means for transferring heat to the coil.

* * * * *